July 24, 1923.
R. SCHMITZ
BRAKE FOR AUTOMOBILES
Filed June 16, 1920    3 Sheets-Sheet 3
1,462,723
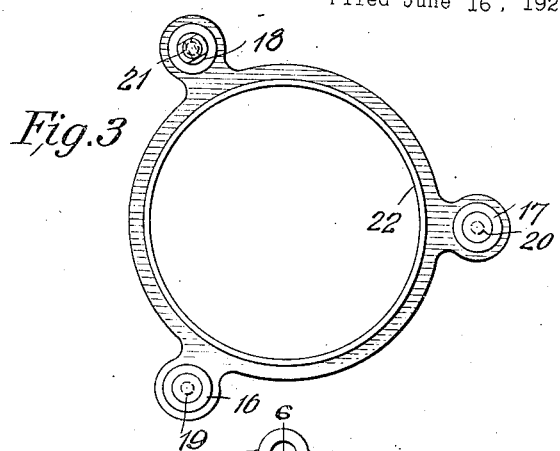
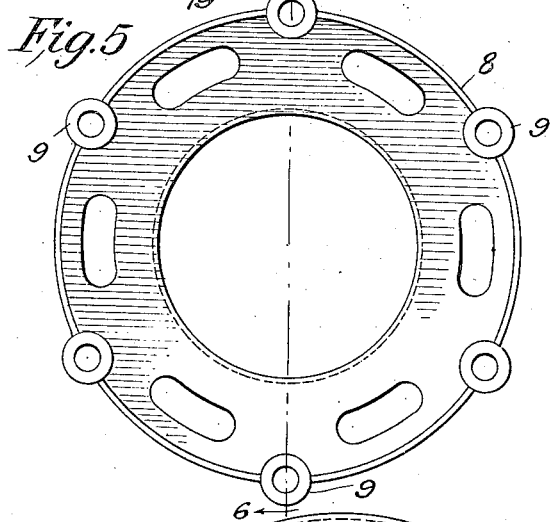
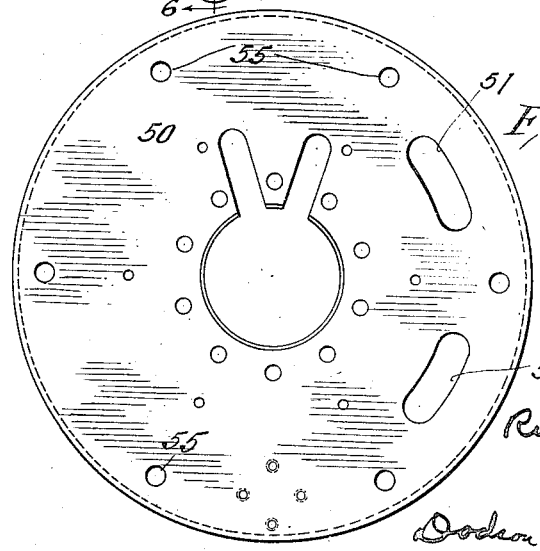
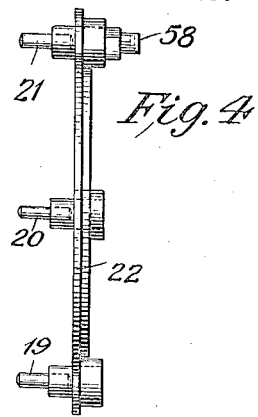
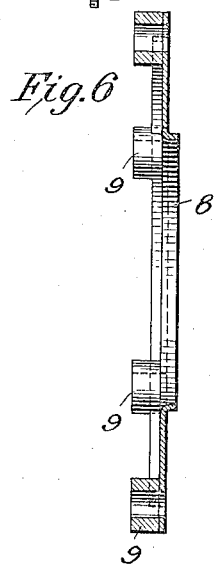
INVENTOR
Richard Schmitz
BY
Dodson and Roe ATTORNEYS Patented July 24, 1923.

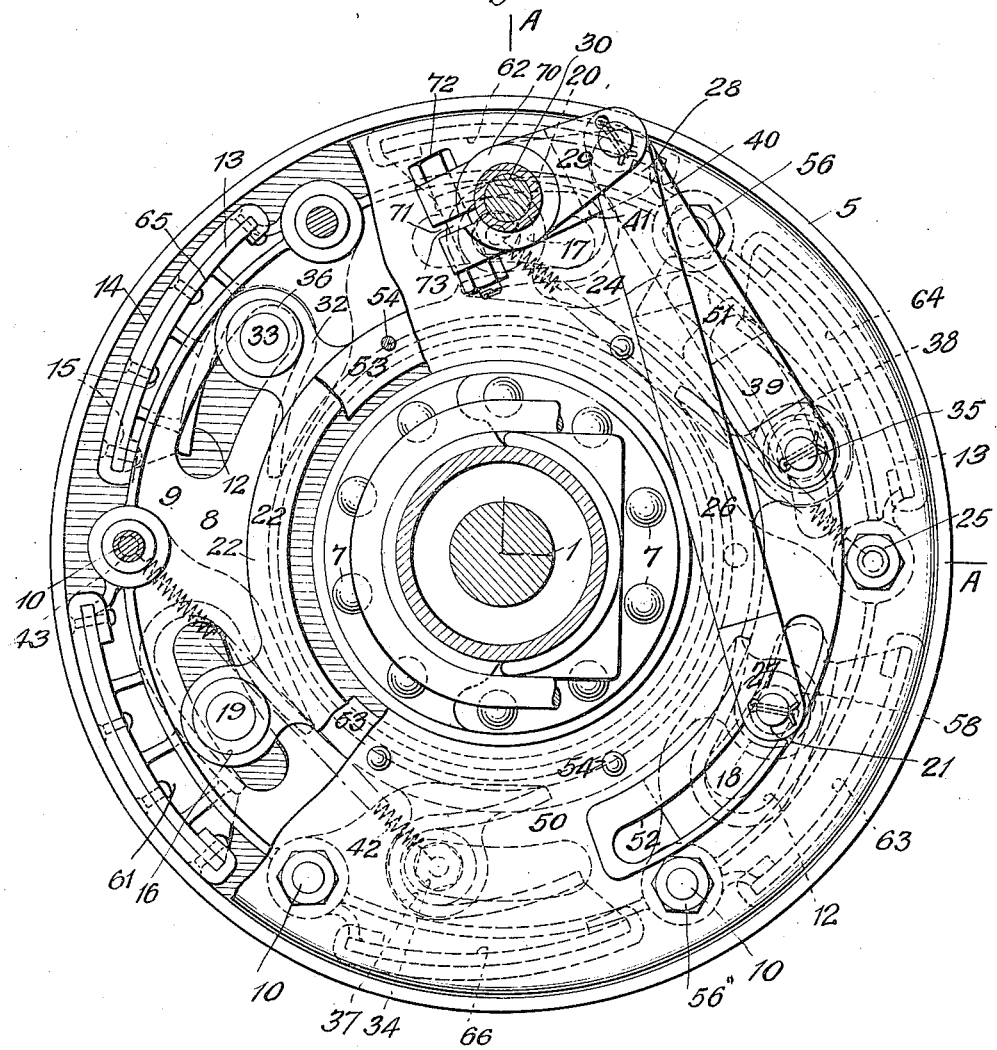

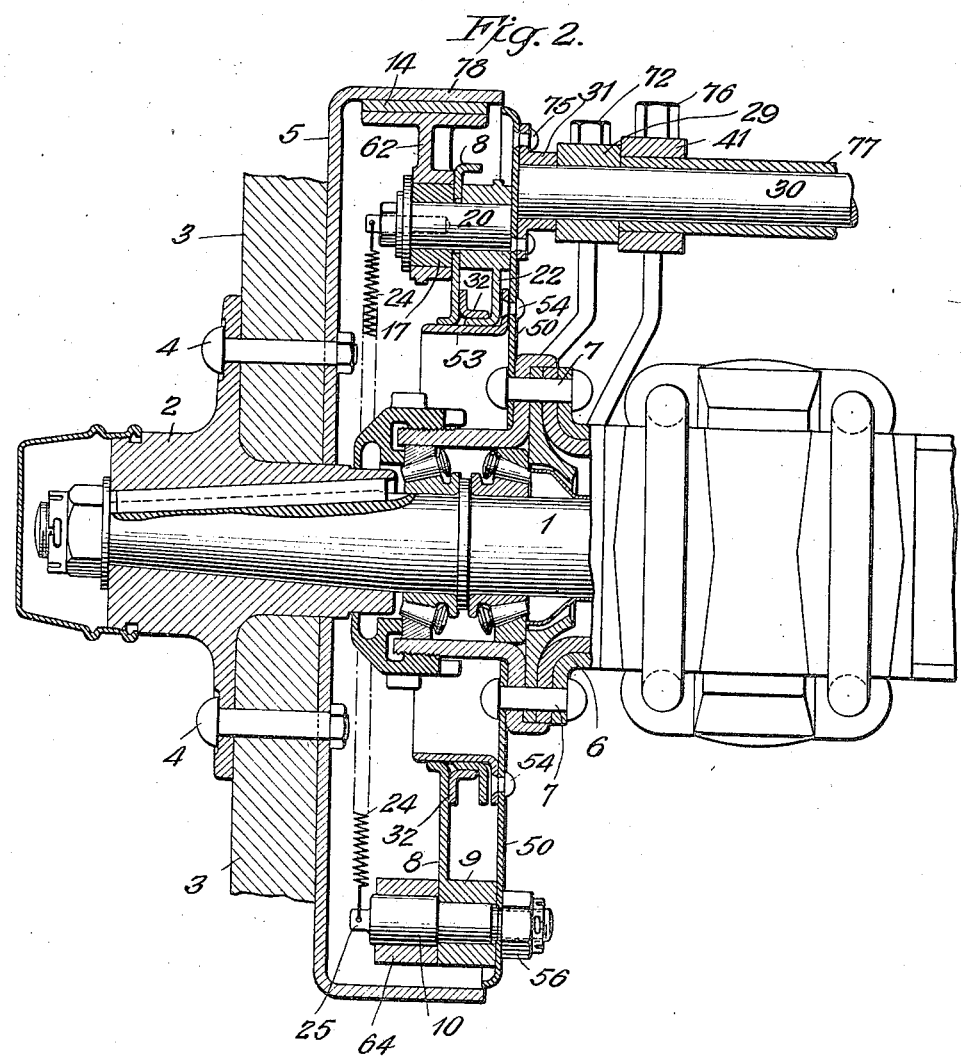

1,462,723

UNITED STATES PATENT OFFICE.

RICHARD SCHMITZ, OF CHICAGO, ILLINOIS, ASSIGNOR TO FERDINAND P. ARM-BRUSTER AND RICHARD SCHMITZ, TRUSTEES, OF CHICAGO, ILLINOIS.

BRAKE FOR AUTOMOBILES.

Application filed June 16, 1920. Serial No. 389,300.

*To all whom it may concern:*

Be it known that I, RICHARD SCHMITZ, a citizen of the United States, and resident of Chicago, in the county of Cook and State of Illinois, have invented a certain new and useful Improvement in Brakes for Automobiles, of which the following is a specification.

My invention relates to that class of brakes which is described in my application for patent, Serial #429,398, filed December 9, 1920, and has for its object to provide a brake which can be utilized as an emergency brake, as a service brake, and which if desired, can be so coupled together that the operation of the emergency brake lever will put into action both the emergency and the service brakes.

It is well known that the present brakes employed on automobiles are more or less unsatisfactory. One of the two, to wit, the expanding type of brake, is placed inside of the brake drum; the other which is the contracting band brake, is placed outside of the drum and contracts upon it. Regardless of the many attempts made by the manufacturer to prevent it, these exterior bands drag upon the brake drums. They are exceedingly noisy, dirty and require numerous adjustments.

My invention has for its object to entirely obviate the necessity of any exterior brake and to provide a construction in which both the emergency and service brakes will be inside of the brake drum, and to a large degree free from dirt and entirely free from noise.

My means of accomplishing the foregoing objects may be more readily understood by having reference to the accompanying drawings which are hereunto annexed and are a part of this specification in which Fig. 1 is a side elevation partly in section, of a brake drum equipped with my improved brake.

Fig. 2 is a section taken on the line A—A in Fig. 1, a fragmentary portion of the wheel, hub and axle being shown.

Fig. 3 is a detail view of one of the roller carrying spiders.

Fig. 4 is a side elevation of the same.

Fig. 5 is a detail view of the supporting plate.

Fig. 6 is a section taken on the line 6—6 in Fig. 5.

Fig. 7 is a detail view of the outside supporting plate.

Similar reference numerals refer to similar parts throughout the entire description.

As shown in the drawings, a fragmentary portion of the axle 1 of the automobile is shown, to which is secured a wheel 2, a fragmentary portion of this only being shown. The spokes 3 are provided with a plurality of bolts 4 which serve to bolt the brake drum 5 rigidly to the wheel so that it rotates therewith.

A fragmentary portion of the housing 6 for the axle is shown, and to this housing is secured by means of rivets 7, the outside supporting plate. This plate is provided with two slots 51 and 52 and also carries an annular member 53 which is secured to the plate 50 by means of rivets 54. This annular member 53 serves the double purpose of furnishing a bearing for the spiders which will be hereinafter described, and also carries the inside supporting plate 8. This plate 8, as more clearly seen in Figs. 5 and 6, is provided with a plurality of bearings 9, in which are mounted pins 10 which carry the brake shoes, 61, 62, 63, 64, 65 and 66. These pins extend through openings 55 formed in the outside supporting plate 50 and are held securely in position by means of nuts 56. These shoes are provided with U-shaped openings 12 and a friction engaging surface 13 which may be provided with suitable brake linings 14 secured in any convenient or desired manner. As shown, a plurality of rivets 15 are employed.

The U-shaped portion of the brake shoes 61, 62 and 63 are engaged by a plurality of rollers, 16, 17 and 18 which are carried upon pins 19, 20 and 21. These pins are provided with reduced ends upon which may be mounted a suitable nut and washer to hold the rollers in position and are mounted in a spider 22 which is rotatable about the annular member 53. Upon the reduced end of the pin 20 which carries the roller 17 is secured one end of a coil spring 24, the other end being attached to the end 25 of one of the brake shoe pivots 10, the purpose of which will be hereinafter explained.

A link 26 having its end 27 secured to the end 58 of the pin 21 is provided, which end projects through the slot 52 formed in the outside supporting plate 50. Its opposite end 28 is pivotally attached to a rocker arm 29. The end 70 of this rocker arm is split as at 71 and a through bolt 72 is provided, having a nut 73 at its opposite end which operates to compress the end 70 and clamp it fixedly to a rock or counter-shaft 30 which is mounted in a suitable bearing 31 attached by means of rivets 75 to the outside supporting plate 50. This counter or rock-shaft 30 may be secured to the service brake in any suitable or desired manner.

The spider 22 is a left-handed spider and is designed to be operated by the service brake lever (not shown). Another spider 32 which is similar to the spider 22 except that it is right hand instead of left hand, is provided and equipped with pins 33, 34 and 35 which carry rollers 36, 37 and 38, which actuate the brake shoes 64, 65 and 66. The terms left and right are employed to indicate that the rollers are on opposite sides of the spiders.

To the pin 35 which projects through the slot 51 in the outside supporting plate 50, is secured one end of a link 39, the opposite end 40 being connected to a rocker arm 41, the end of which is also split in like manner as the end 70 of the rocker arm 29, a through bolt 76 being provided to clamp the rocker arm 41 securely to a sleeve 77 which telescopes the rock shaft 30 and is adapted to be suitably connected to the emergency brake lever (not shown.)

To one end of the pin 34 which carries the roller 37 is attached a coil spring 42, its other end being secured to the reduced end 43 of one of the pivot pins for carrying the brake shoe 61.

In order to actuate the service brake the device will operate as follows: The shifting of the rockshaft 30 swings the rocker arm 29 on the arc of a circle. This carries with it the link 26, the movement of which is permitted by reason of the slot 51, and, in turn, the spider 22 is rotated about the annular member 53. This obviously carries with it the rollers 16, 17 and 18 and since the brake shoes 61, 62 and 63 are stationary, the rollers move toward the outer end of the U-shaped opening 12, swinging the brake shoes upon their pivot pins 10 and causing the friction engaging surface 14 to firmly grip the inside flange 78 of the brake drum 5.

It will be apparent that the braking pressure can be tremendously increased without a great pressure upon the foot pedal (not shown) which operates the service brake. The coil spring 24 operates to hold the spider 22 in a position which will hold the brake shoes 61, 62 and 63 normally out of engagement with the flange 78 so that when the pressure upon the foot pedal (not shown) is released, the spring will rotate the spider as above described and thus move the brake shoes away from the flange 78.

The operation of the emergency brake is precisely similar save that it shifts the spider 32 and through the medium of the rollers 36, 37 and 38 moves the brake shoes 64, 65 and 66 causing them to grip the inner surface of the flange 78 of the brake drum 5.

It will be apparent to persons skilled in the art, from the foregoing description, that this construction provides both emergency and service brakes which are entirely enclosed within the brake drum and are effectually protected from dirt; the noise is also entirely obviated.

Having described my invention what I regard as new and desire to secure by Letters Patent is:

1. The combination with a brake drum of a fixed supporting plate, a plurality of brake shoes pivotally mounted on said plate, a right hand and a left hand spider, rotatable means carried thereby which actuate the brake shoes, means to cause said rotatable means to actuate a portion of said shoes and means to actuate the remainder of said shoes.

2. The combination with a brake drum of a fixed supporting plate, a plurality of brake shoes pivotally mounted on said plate, a right hand and a left hand spider, rotatable means carried thereby which actuate the brake shoes, means to cause said rotatable means to actuate a portion of said shoes, means to actuate the remainder of said shoes, and means to connect the last-named means to the former whereby its operation will actuate all of the shoes.

3. The combination with a brake drum of a fixed supporting plate, a plurality of brake shoes pivotally mounted on said plate, a right hand and a left hand spider, pins on said spiders, rollers on said pins which actuate the brake shoes, means to cause said rollers to actuate a portion of said brake shoes, and means to actuate the remainder of said shoes.

4. The combination with a brake drum of a fixed supporting plate, a plurality of brake shoes pivotally mounted on said plate, a right hand and a left hand spider, pins on said spiders, rollers on said pins which actuate the brake shoes, means to cause said rollers to actuate a portion of said brake shoes, and means to actuate the remainder of said shoes, means to connect the last named means to the former whereby its operation will actuate all of the shoes.

5. The combination with a brake drum of a fixed supporting plate, a plurality of brake shoes pivotally mounted on said plate, a right hand and a left hand spider, rotatable means carried thereby which actuate the brake shoes, means to cause said rotatable means to actuate a portion of said shoes, means to actuate the remainder of said shoes, and springs which hold the shoes normally out of engagement with the brake drum.

6. The combination with a brake drum of a fixed supporting plate, a plurality of brake shoes pivotally mounted on said plate, a right hand and a left hand spider, rotatable means carried thereby which actuate the brake shoes, means to cause said rotatable means to actuate a portion of said shoes, means to actuate the remainder of said shoes, means to connect the last named means to the former whereby its operation will actuate all of the shoes, and springs which hold the shoes normally out of engagement with the brake drum.

7. The combination with a brake drum of a fixed supporting plate, a plurality of brake shoes pivotally mounted on said plate, a right hand and a left hand spider, pins on said spiders, rollers on said pins which actuate the brake shoes, means to cause said rollers to actuate a portion of said brake shoes, means to actuate the remainder of said shoes, and springs which hold the shoes normally out of engagement with the brake drum.

8. The combination with a brake drum of a fixed supporting plate, a plurality of brake shoes pivotally mounted on said plate, a right hand and a left hand spider, pins on said spiders, rollers on said pins which actuate the brake shoes, means to cause said rollers to actuate a portion of said brake shoes, and means to actuate the remainder of said shoes, means to connect the last named means to the former whereby its operation will actuate all of the shoes, and springs which hold the shoes normally out of engagement with the brake drum.

9. The combination with a brake drum of a fixed outside supporting plate, a plurality of pins mounted therein, a plurality of brake shoes pivotally mounted on said pins, an annular member riveted to said supporting plate, an inner supporting plate provided with openings which register with the said pins, a right hand and a left hand spider rotatably mounted on said annular member, pins carried by said spiders and rollers mounted on said pins, the rollers on the right hand spider actuating alternate brake shoes, and the rollers on the left hand spider actuating the remaining brake shoes, a link pivotally attached to a pin carried by the left hand spider, a rocker arm to which the other end of said link is pivotally attached, a rock-shaft to swing said rocker arm and thereby rotate the left hand spider upon the annular member and project a portion of the brake shoes outwardly, a link attached to one end of a pin carried by the right hand spider, a rocker arm to which the other end of said link is pivotally attached, a sleeve to which said rocker arm is fixedly secured whereby the rocking of the sleeve will rotate the right hand spider upon the annular member and thereby project the remainder of the brake shoes outwardly, there being slots in said supporting plate through which the pins to which the links are secured, project.

10. The combination with a brake drum of a fixed outside supporting plate, a plurality of pins mounted therein, a plurality of brake shoes pivotally mounted on said pins, an annular member riveted to said supporting plate, an inner supporting plate provided with openings which register with the said pins, a right hand and a left hand spider rotatably mounted on said annular member, pins carried by said spiders and rollers mounted on said pins, the rollers on the right hand spider actuating alternate brake shoes and the rollers on the left hand spider actuating the remaining brake shoes, a link pivotally attached to a pin carried by the left hand spider, a rocker arm to which the other end of said link is pivotally attached, a rock shaft to swing said rocker arm and thereby rotate the left hand spider upon the annular member and project a portion of the brake shoes outwardly, a link attached to one end of a pin carried by the right hand spider, a rocker arm to which the other end of said link is pivotally attached, a sleeve to which said rocker arm is fixedly secured whereby the rocking of the sleeve will rotate the right hand spider upon the annular member and thereby project the remainder of the brake shoes outwardly, there being slots in the said supporting plate through which the pins to which the links are secured, project, and springs to hold said brake shoes normally out of engagement with the brake drum.

In testimony whereof I have signed the foregoing specification.

RICHARD SCHMITZ.